3,520,851
FORMALDEHYDE COPOLYMERIZATION PROCESS
Hugh Harper Gibbs, Crestfield, Wilmington, Del., assignor to E. I. du Pont de Nemours and Company, Wilmington, Del., a corporation of Delaware
No Drawing. Filed July 20, 1967, Ser. No. 654,678
Int. Cl. C08g 1/20
U.S. Cl. 260—67        7 Claims

ABSTRACT OF THE DISCLOSURE

Antimony pentafluoride is employed as a catalyst to copolymerize formaldehyde with styrene oxide and cyclohexene oxide in a hydrocarbon diluent at a temperature of from −45 to 35° C.

---

The present invention provides a process for the preparation of high molecular weight copolymers of formaldehyde with substituted olefin oxides, for example, cyclohexene oxide and styrene oxide by the employment of antimony pentafluoride.

Formaldehyde has been homopolymerized in the presence of both anionic and cationic initiators, cf., U.S. Pat. 2,994,687 issued Aug. 1, 1961, to Goodman et al. and U.S. Pat. 3,002,952, issued Oct. 3, 1961 to T. E. O'Conner. However, the copolymerization of formaldehyde with the oxides disclosed hereinabove to high molecular weight copolymers is not readily accomplished using catalysts which are quite satisfactory for homopolymerization of formaldehyde to high molecular weight polymer. Accordingly, the present invention provides a unique process for the copolymerization of formaldehyde with styrene or cyclohexene oxide.

Substantially pure anhydrous formaldehyde is employed in the present process. This formaldehyde should contain less than about a tenth of a percent by weight of substances which react with formaldehyde or interfere with the polymerization of formaldehyde. Methods of obtaining such formaldehyde are known.

The oxides employed as comonomers in the present process should be in reasonably pure form and especially should be substantially free from protonic impurities. A convenient method for purification of the oxide involves momentarily contacting it with activated alumina and subsequently distilling it at atmospheric pressure into a sealed vessel.

The catalyst used in the present process is preferably introduced into the reaction medium as a freshly prepared solution in a saturated unsymmetrical chlorofluorocarbon such as trichlorotrifluoroethane. The preferred concentration of catalyst is from $10^{-4}$ to $10^{-5}$ moles per moles of formaldehyde.

Copolymerization may be conducted in any medium in which the comonomers may be intimately contacted in the presence of the catalyst. The medium should not react with the monomers or polymer and should not excessively deactivate the catalyst. Especially preferred is an inert liquid hydrocarbon containing 3–10 carbon atoms, e.g., heptane, cyclohexane and toluene. Dioxane is also conveniently employed as a polymerization medium. The process of the present invention is conducted at a temperature in the range −50 to +35° C. and preferably in the range −45° C. to +25° C. at atmospheric pressure. Pressures above or below atmospheric pressure can be employed.

The copolymers produced by the process of the present invention exhibit substantial base stability and a melting point lower than that of polyoxymethylene homopolymer. The number average molecular weight of the copolymers of the present invention is conveniently determined by measurement of the inherent viscosity. In a given system the inherent viscosity can be correlated with the number average molecular weight. This parameter along with the base stability and melting point depression characterize the products of the process of the present invention.

The treatment of the products of the present invention with base reveals the presence of the comonomer unit and provides a convenient method for refining the polymer. The base treatment involves dissolving approximately 2.0 grams of polymer under a nitrogen blanket at a 165° C. in 50 ml. of benzyl alcohol containing two potassium hydroxide pellets. After heating for 15 minutes at 165° C., the solution is cooled and the precipitated polymer is filtered, crushed and washed with 100 ml. portions of methanol, methanol and water (50/50 vol.), water, methanol and acetone (50/50 vol.), and acetone in that order. The treated product is dried in a vacuum oven under nitrogen for 2 hours at 120° C. Base stability is expressed as the percentage of the original polymer remaining after treatment.

Inherent viscosity is measured by dissolving 0.075 gram of the polymer in 15 ml. of reagent grade phenol which has been purified by distillation from solid caustic. The mixture can then be heated to 120° C. to effect solution of the polymer. The viscosity of the phenol solvent and the viscosity of the phenol polymer solution is measured at 90° C. by noting the time required to pass the same volume of each material through an Ostwald viscometer. The inherent viscosity (IV) is then determined by using the formula:

$$IV = 2.303 \frac{\log \frac{\text{time of solution}}{\text{time of solvent}}}{\text{weight of polymer in 100 cc of phenol}}$$

An IV of 1.0 corresponds to a number average molecular weight of approximately 38,000, an IV of 1.2 to a number average molecular weight of 50,000, 0.5 to a weight of 14,000 and 0.4 to a weight of about 10,000.

The melting point of the copolymers of the present invention is determined by differential thermal analysis according to the general method described in the chapter "Applications of Differential Thermal Analysis to High Polymers," Organic Analysis, vol. 4, page 361, Interscience Publishers, Inc., 1960. A du Pont Model 900 differential thermal analyzer is adjusted to a heating rate of 10° C. per minute using glass beads as a reference and a sample of polymer is placed in a capillary tube 1.5–2.0 mm. in diameter and 2.5 cm. in length which is maintained under a nitrogen blanket. The polymer is heated to 15° C. above its original melting point following which it is cooled for approximately 5 minutes until it reaches a temperature of about 130° C. whereupon sample is reheated and the melting point is observed. Since molecular weight influences the melting point of a polymer, a correction factor must be applied according to the following table.

TABLE 1

| Inherent viscosity: | Correction to observed melting point (° C.) |
|---|---|
| 2.5 | −3 |
| 2.0 | −2 |
| 1.5 | −1 |
| 1 | 0 |
| 0.5 | +3 |

The differential thermal analzer is calibrated each day it is used employing as a reference a homopolymer having an inherent viscosity of 1 to 1.1 which is prepared according to the general procedure described in U.S. Pat. 2,994,687 issued on Aug. 1, 1961 to H. H. Goodman et al.

The following examples are presented to illustrate but not to restrict the present invention. Parts and percentages are by weight unless otherwise specified.

EXAMPLES I–VI

Cyclohexyhemiformal containing less than 0.5% water was prepared according to the teachings of U.S. Pat. 2,848,500 issued on Aug. 19, 1958, to D. L. Funck. This hemiformal was pumped at a rate of approximately 25 cc. per minute through one neck of a two-necked, two liter round bottom flask having an overflow on the side. Unpyrolized materials passed through the overflow and were discarded. The formaldehyde gas emerging from the second neck of the flask was passed throuhg a bubbler containing mineral oil at room temperature and then through a U-tube approximately 16 inches long, 1 inch in diameter, filled with a stainless steel coiled-mesh packing maintained at room temperature. The formaldehyde gas was then directed through 6 U-tubes packed with steel mesh for an effective length of 60 inches and maintained at −18° C. The formaldehyde gas from these low temperature U-tubes (approximately 2 grams per minute) was directed to a polymerization vessel which consisted of a 500 cc. three-neck round bottom flask having 3 serum ports in addition to 3 standard necks. An agitator was placed in the center neck and the third neck was vented into the atmosphere. All apparatus employed in the copolymerization was thoroughly dried by heating with a flame while passing dry nitrogen through the apparatus. Approximately 300 cc. of purified dry heptane was charged to the reaction vessel and the temperature adjusted to that indicated in Table II. The indicated oxide was purified by passing it through a tube 1 inch in diameter 18 inches long filled with activated alumina and subsequently distilling into an enclosed vessel. The oxide was then dissolved in dry heptane and introduced through the third serum port at a rate sufficient to obtain the mole ratio indicated in Table II simultaneously with the formaldehyde and initiator. The initiator was added as a 10% solution of unsymmetrical trichlorotrifluoroethane through a serum port. After introduction of the reactants and catalyst the polymerization vessel was maintained at the indicated temperature for 5–7 minutes with agitation until the slurry thickened, whereupon all feeds were stopped. While the agitation was continued five cc. of tri-n-butylamine were added to the vessel after the contents were brought to room temperature.

The product was removed from the polymerizer and transferred to a sintered glass filter. The liquid layer was removed and the polymer washed with methanol (300 cc.) and acetone (300 cc.) following which it was dried overnight in a vacuum oven at room temperature under a blanket of nitrogen. Base stability, inherent viscosity and melting points are reported in Table II.

It may be seen from the foregoing examples that the catalyst of the present invention is quite effective in the production of a copolymer of formaldehyde with the cyclohexene and styrene oxide.

TABLE II

| Ex. No. | Comonomer | Moles comonomer, moles CH₂O in feed | Moles catalyst, moles CH₂O in feed (calculated) | Reaction temp. (° C.) | Base stable fraction percent | Inherent viscosity | Melting point depression (corrected) (° C.) |
|---|---|---|---|---|---|---|---|
| 1 | Styrene oxide | 0.047 | 2.4×10⁻³ | 30 | 43 | 0.94 | 3 |
| 2 | do | 0.051 | 1.9×10⁻³ | −20 | 55 | 1.83 | 8.5 |
| 3 | do | 0.029 | 1.3×10⁻³ | −45 | 63 | 2.36 | 13 |
| 4 | do¹ | ²0.015 | 4.2×10⁻⁵ | 25 | 44 | 1.09 | 5.5 |
| 5 | Cyclohexene oxide | 0.11 | 1.9×10⁻³ | 25 | 56 | 1.26 | 4.5 |
| 6 | do¹ | 0.016 | 5.0×10⁻⁵ | −20 | 45 | 2.03 | 12.5 |

¹ Added as 25% by volume in dry heptane.   ² U-tubes maintained at 2° C.

What is claimed is:
1. A process for the preparation of a high molecular weight acetal copolymer which comprises contacting substantially anhydrous formaldehyde with an oxide selected from the class consisting of styrene oxide and cyclohexene oxide in the presence of antimony pentafluoride and thereafter recovering said copolymer.

2. A process for the copolymerization of formaldehyde and an oxide selected from the class consisting of styrene oxide and cyclonexene oxide which comprise contacting substantially anhydrous formaldehyde with said oxide in an inert hydrocarbon reaction medium at a temperature in the range −45° C. to +35° C. in the presence of a catalytic amount of antimony pentafluoride and thereafter recovering a copolymer of formaldehyde and said oxide.

3. A process for copolymerizing formaldehyde with an oxide selected from the class consisting of cyclohexene oxide and styrene oxide to a high molecular weight acetal copolymer which comprises introducing substantially pure formaldehyde vapor and asid oxide into a reaction medium comprising an inert liquid hydrocarbon containing a catalytic amount of antimony pentafluoride, maintaining said medium at a temperature in the range −45° C. to +35° C. and thereafter recovering a high molecular weight copolymer of formaldehyde and said oxide.

4. The process of claim 1 wherein said preparation is conducted in the temperature range −45° C. to +25° C.

5. The process of claim 4 wherein the ratio of the moles of antimony pentafluoride to the moles of formaldehyde introduced is maintained in the range $10^{-4}$ to $10^{-5}$.

6. The process of claim 5 wherein the ratio of the moles of oxide to the moles of formaldehyde introduced is in the range 0.015 to 0.11.

7. The process of claim 3 wherein (1) the ratio of the moles of antimony pentafluoride to the moles of formaldehyde introduced is in the range $10^{-4}$ to $10^{-5}$, (2) the ratio of the moles of oxide introduced to the moles of formaldehyde introduced is in the range 0.015 to 0.11 and (3) the reaction media is maintained at a temperature in the range −45° C. to +25° C.

References Cited

UNITED STATES PATENTS

| 3,346,663 | 10/1967 | Kern et al. | 260—73 XR |
| 3,356,649 | 12/1967 | Wolf | 260—73 |
| 3,379,789 | 4/1968 | Weissermel et al. | 260—823 |
| 3,379,655 | 4/1968 | May et al. | 260—2 |

WILLIAM SHORT, Primary Examiner

L. M. PHYNES, Assistant Examiner

U.S. Cl. X.R.

260—73